UNITED STATES PATENT OFFICE.

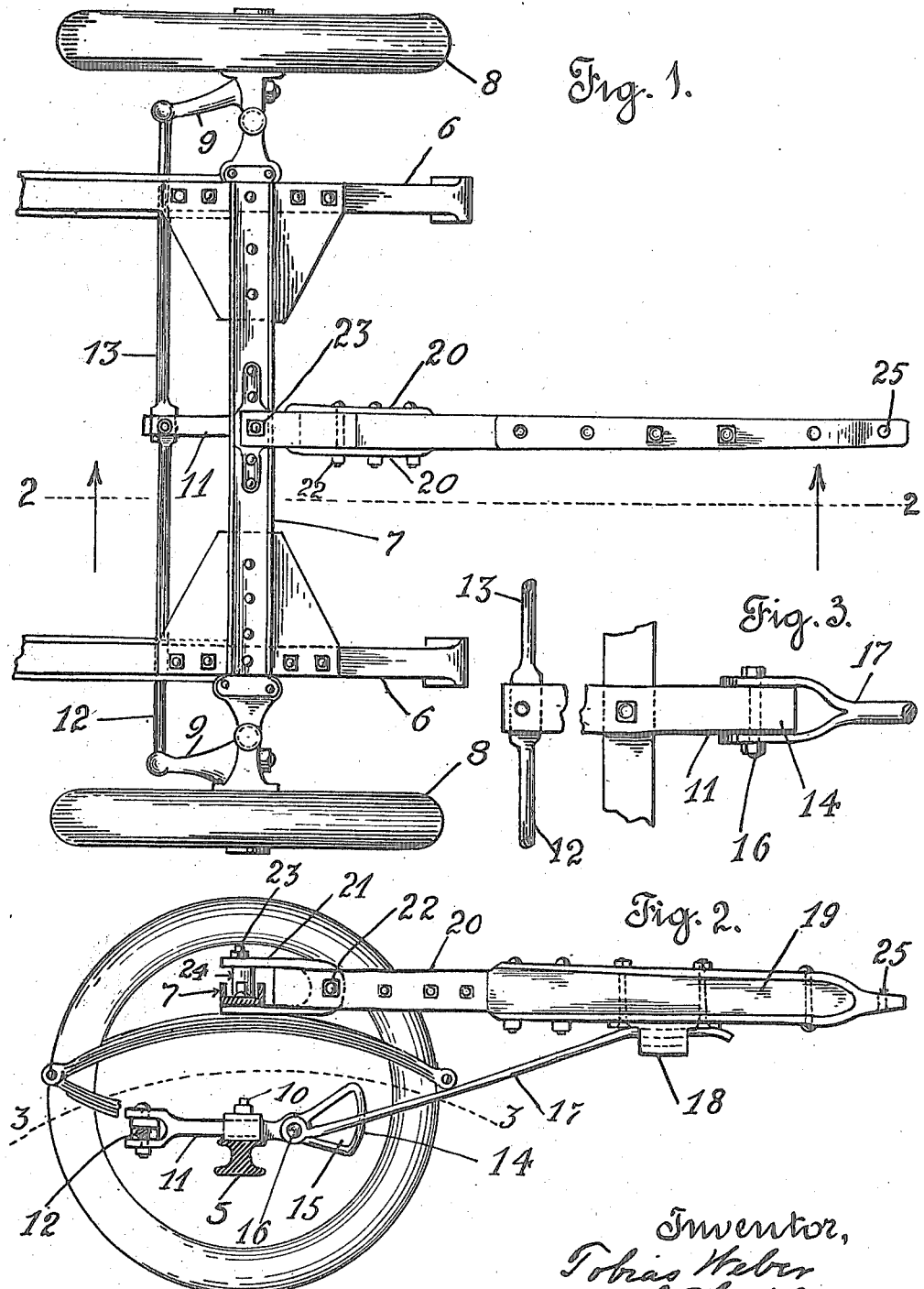

TOBIAS WEBER, OF LOS ANGELES, CALIFORNIA.

TRAILER-COUPLING.

1,248,765.   Specification of Letters Patent.   Patented Dec. 4, 1917.

Application filed May 24, 1917. Serial No. 170,712.

*To all whom it may concern:*

Be it known that I, TOBIAS WEBER, a citizen of the United States, residing at the city of Los Angeles, county of Los Angeles, State of California, have invented new and useful Improvements in Trailer-Couplings, of which the following is a specification.

My invention relates primarily to means for coupling a trailer to an automobile, and the object thereof is to provide a coupling having the maximum efficiency in guiding the trailer and which will give such efficiency until worn out.

In the drawings forming a part of this application:

Figure 1 is a top plan of the front portion of an auto-trailer equipped with my coupling device.

Fig. 2 is a section on the line 2—2 of Fig. 1 with parts broken away.

Fig. 3 is a section on the line 3—3 of Fig. 2 with parts broken away.

Referring to the drawings 5 is the axle, 6 are the front springs, 7 is the front or draft beam of the chassis, 8 are the front wheels, 9 are the steering knuckles of a trailer. These parts are all of any approved construction and form no part of my invention.

Mounted for horizontal movement upon the axle by bolt 10 is the steering bar 11. The rear end is bifurcated for the reception of the ends of the connecting rods 12 and 13 which connect the steering bar to the steering knuckles. The front end of the steering bar has an enlarged end 14 which for lightness has a transverse opening 15 therethrough and will be termed a hollow head. Back of the head is a transverse bolt hole in which is received bolt 16 which connects steering tongue 17 with the steering bar. The rear end of the steering tongue is bifurcated and straddles the head of steering bar. The front end of the steering tongue passes through a sleeve 18 secured upon the bottom of the draft tongue 19. The rear end of tongue 19 has draft plates 20 secured to the sides thereof which project beyond the central portion thereof and straddle clevis 21 and are pivotally connected to the clevis by bolt 22 for vertical movement of the front end of the tongue. Clevis 21 has a transverse hole in its front end through which bolt 22 passes and the rear ends have vertical holes through which king bolt 23 passes to secure the clevis to draft bar 7. A spacer 24 surrounds bolt 23 between the arms of the clevis.

It will be observed that the connection between the steering bar and steering tongue allows for free vertical movement of the front end of the tongue and for a large contact between the parts to resist horizontal thrust, and this is likewise true of the connection of the draft tongue to the draft bar. The draft tongue has a hole 25 to enable it to be connected to a towing machine, not shown.

In case cheapness of construction is desired, by making the steering bar and tongue sufficiently strong the trailer can be towed thereby and the draft tongue omitted, but I have found in practice that the use of both the steering and draft tongues and connected parts gives the best results.

Having described my invention what I claim is:

A trailer coupling comprising a draft tongue mounted on the chassis for horizontal and vertical movement of the front end thereof; a sleeve secured to the under side of said tongue; a steering bar mounted on the axle of the trailer for horizontal movement, said bar having a hollow head; and a steering tongue having a bifurcated end straddling said head and pivotally connected to said bar for vertical movement of the front end thereof, said front end passing through the sleeve on the draft tongue.

In witness that I claim the foregoing I have hereunto subscribed my name this 5th day of May, 1917.

TOBIAS WEBER.